US008103752B2

(12) United States Patent
Parry

(10) Patent No.: US 8,103,752 B2
(45) Date of Patent: Jan. 24, 2012

(54) SYSTEM AND METHOD FOR FACILITATING DISTRIBUTION OF A TRANSLATOR

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3064 days.

(21) Appl. No.: 10/326,477

(22) Filed: Dec. 19, 2002

(65) Prior Publication Data

US 2003/0097434 A1 May 22, 2003

Related U.S. Application Data

(63) Continuation-in-part of application No. 10/283,451, filed on Oct. 30, 2002, now Pat. No. 7,451,442, which is a continuation-in-part of application No. 09/954,832, filed on Sep. 12, 2001, now abandoned.

(51) Int. Cl.
*G06F 15/177* (2006.01)

(52) U.S. Cl. ........ 709/222; 709/201; 709/220; 709/223; 707/102; 702/185

(58) Field of Classification Search .................. 709/222, 709/201, 220, 223; 707/102; 702/185
See application file for complete search history.

(56) References Cited

U.S. PATENT DOCUMENTS

| | | | | |
|---|---|---|---|---|
| 5,956,487 | A | 9/1999 | Venkatraman et al. | |
| 6,092,078 | A * | 7/2000 | Adolfsson | 707/102 |
| 6,148,346 | A | 11/2000 | Hanson | |
| 6,170,007 | B1 | 1/2001 | Venkatraman et al. | |
| 6,598,011 | B1 * | 7/2003 | Howards Koritzinsky et al. | 702/185 |
| 6,857,013 | B2 * | 2/2005 | Ramberg et al. | 709/223 |
| 6,965,928 | B1 * | 11/2005 | Cox et al. | 709/220 |
| 2003/0041095 | A1 * | 2/2003 | Konda et al. | 709/201 |

OTHER PUBLICATIONS

U.S. Patent Application entitled "System and Method for Installing a Translator", having U.S. Appl. No. 10/283,451, filed Oct. 30, 2002.
U.S. Patent Application entitled "System and Method for Facilitating Generation of Hard Copies", having U.S. Appl. No. 09/954,832, filed Sep. 12, 2001.

* cited by examiner

*Primary Examiner* — Kyung H Shin

(57) ABSTRACT

Disclosed are systems and methods for installing translators. In one embodiment, a system and a method pertain to identifying devices that are to receive the translator, and facilitating transmission of the translator from a first imaging device that possesses the translator, wherein transmission of the translator from the first imaging device facilitates receipt of the translator by the devices identified to receive the translator.

28 Claims, 9 Drawing Sheets

100
102
NETWORK
108
104
106
112
NETWORK
110
106
106

SYSTEM AND METHOD FOR FACILITATING DISTRIBUTION OF A TRANSLATOR

CROSS-REFERENCE TO RELATED APPLICATIONS

This application is a continuation-in-part (CIP) of and claims the benefit of the filing date of U.S. patent application Ser. No. 10/283,451 filed Oct. 30, 2002, now U.S. Pat. No. 7,451,442 which, in turn, is a CIP of U.S. patent application Ser. No. 09/954,832 filed Sep. 12, 2001, now abandoned both of which are hereby incorporated by reference in their entireties into the present disclosure.

BACKGROUND

Device drivers are normally used by computing devices (e.g., personal computers (PCs)) to communicate with other devices. For example, printer drivers are typically needed to send jobs from a user application (e.g., word processing application) executing on the computing device to a printer. Generally speaking, drivers comprise software programs that control the device that is to be utilized. The driver acts as a translator between the end device and applications that use the device in that each device has its own specialized language that it speaks. Drivers therefore are adapted to accept generic commands from an application and translate the generic commands into specialized commands for the end device.

Device drivers are usually provided to the user upon purchase of a particular device. Alternatively or in addition, a driver for a recently acquired device can be downloaded from the Internet. In that each driver is specifically adapted for a particular device, the user normally must install on his or her computer a different driver for each device that the user intends to access. Moreover, to obtain optimal performance, the user may need to periodically update the drivers as improved versions are developed by the device manufacturer.

Recently, some imaging device manufacturers have developed so-called “driverless” systems in which the user need not install a driver on his or her computer to access and use a given device. In one such arrangement, a print server is used that stores and is able to execute all drivers for all devices connected to a network. In this arrangement, jobs are sent to the print server, which acts as a translator for the end device that is to execute the job. In another arrangement, each end device stores its associated driver on internal memory.

While providing an improvement over more conventional systems, known driverless systems do not solve other problems. Aside from security issues discussed in U.S. patent application Ser. No. 09/954,832, the user or system administrator must still manually install the appropriate translators. For example, if an imaging device does not already comprise the translator needed for a particular print job, this translator must somehow be installed on the print server or the device. Additionally, from time to time it will be desirable to update one of more of these translators as new versions are made available.

Even where the process of installing a translator on the end device is, at least in part, automated, as described in U.S. patent application Ser. No. 10/283,451, the translator installation process must be initiated separately for each end device that is to receive the translator. This can be tedious for the system administrator if many translators are to be installed (even the same translator) on many different devices, for example in an enterprise environment. Furthermore, it can be difficult to track which devices have received the translators in such a situation.

SUMMARY OF THE DISCLOSURE

Disclosed are systems and methods for installing translators. In one embodiment, a system and a method pertain to identifying devices that are to receive the translator, and facilitating transmission of the translator from a first imaging device that possesses the translator, wherein transmission of the translator from the first imaging device facilitates receipt of the translator by the devices identified to receive the translator.

BRIEF DESCRIPTION OF THE DRAWINGS

The disclosed systems and methods can be better understood with reference to the following drawings. The components in the drawings are not necessarily to scale.

DETAILED DESCRIPTION

As described above, it can be difficult for a system administrator to distribute translators to several end devices, even where installation on a single device is substantially automated. Moreover, tracking this installation can be challenging, especially where many different end devices are to be provided with a translator. As described in the following, however, a translator can be first installed on a given imaging device by, for example, including the translator in a print job delivered to the imaging device. Once the translator is installed (by any means), the translator can be distributed to other imaging devices whether they be of like or different configuration. Such distribution is, at least in part, facilitated by an imaging device that received a translator.

Disclosed herein are embodiments of systems and methods that facilitate translator distribution to end devices such as imaging devices. To facilitate description of the systems and methods, example systems are first discussed with reference to the figures. Although the systems are described in detail, these systems are provided for purposes of illustration only and various modifications are feasible. After the description of the example systems, examples of operation of the systems are provided to explain the manners in which translators can be distributed.

Figure 1:
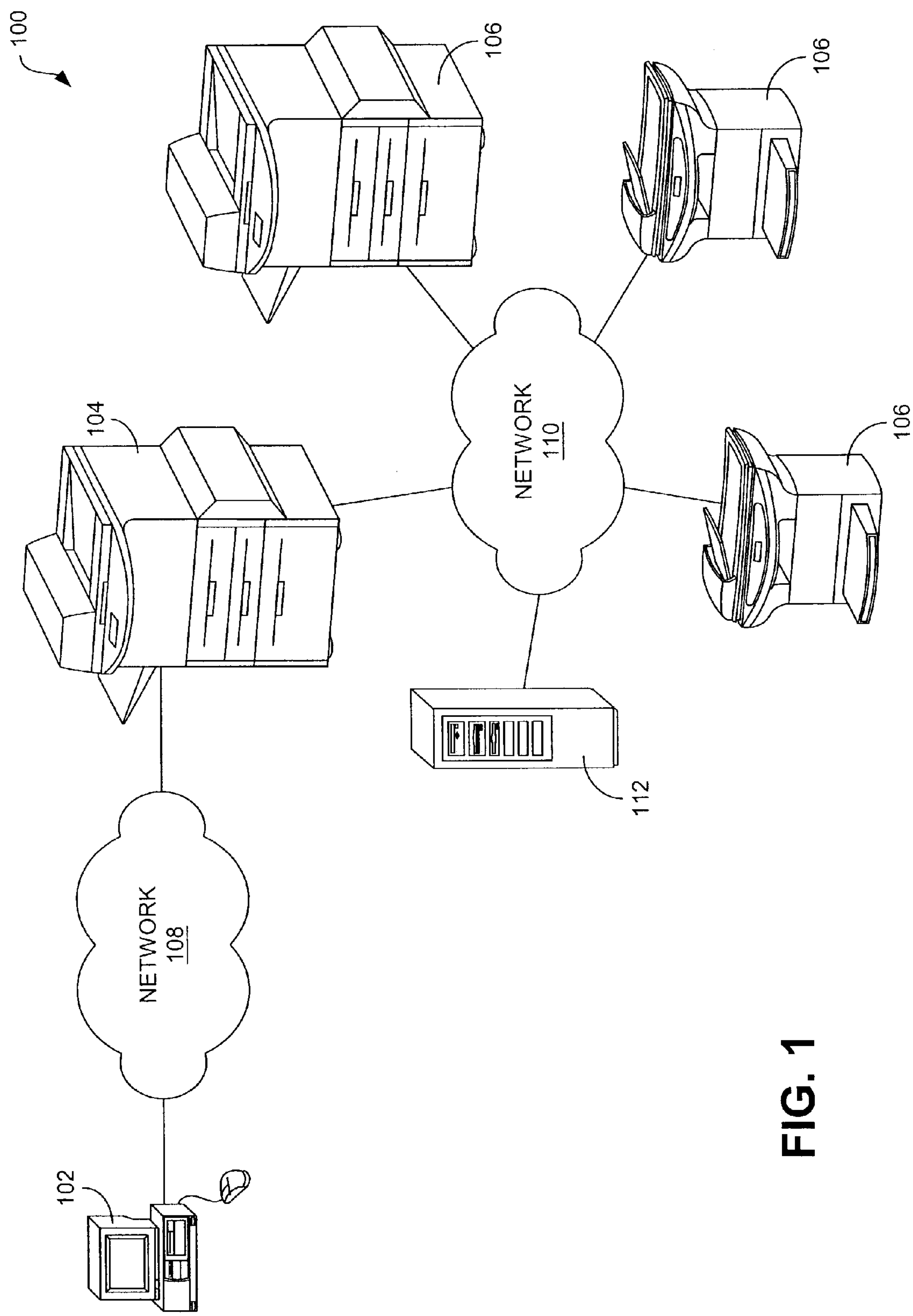
FIG. 1 is a schematic view of an embodiment of a system that facilitates installation of a translator.

Referring now in more detail to the drawings, in which like numerals indicate corresponding parts throughout the several views, FIG. 1 illustrates an example system 100. As indicated in this figure, the system 100 generally comprises a user computing device 102 and one or more imaging devices 104 and 106. The computing device 102 comprises substantially any device that is capable of communicating with an imaging device by transmitting data to and/or receiving data from the imaging device. By way of example, the computing device 102 comprises a personal computer (PC). Although a PC is shown in FIG. 1 and has been identified herein, the computing device 102 could, alternatively, comprise another type of computing device including, for instance, a Macintosh computer, a notebook computer, or even a handheld device such as a personal digital assistant (PDA) or a mobile telephone.

The imaging devices 104 and 106 comprise substantially any device that is capable of generating hardcopy documents including, for example, printers, photocopiers, facsimile machines, multifunction peripheral (MFP) devices, all-in-one devices, etc. As is discussed in greater detail below, the imaging devices 104, 106 are configured to obtain (e.g., receive) and install translators that are used to translate data in a first format or language into a machine format or language that the imaging device uses. In addition one or more imaging devices 104, 106 can then be used to facilitate distribution to, and therefore installation on, other imaging devices.

As is further identified in FIG. 1, communications between the computing device 102 and the imaging device 104, as well as between the imaging device 104 and the imaging devices 106, can be facilitated with networks 108 and 110. Although the networks 108 and 110 are shown as separate in FIG. 1, the networks could overlap each other. Indeed, in some embodiments, the networks 108 and 110 may comprise the same network. Regardless, each network 108 and 110 may comprise a single network or two or more sub-networks that are communicatively coupled to each other. By way of example, the networks 108, 110 include one or more local area networks (LANs) and/or wide area networks (WANs). In some embodiments, the networks 108, 110 may comprise a set of networks that forms part of the Internet. In an alternative arrangement, the computing device 102 can communicate directly with one or more of the imaging devices 104, 106.

Also depicted in FIG. 1 is an auxiliary computing device 112 that, when provided, may act as an agent for an imaging device (imaging device 104 in this example) in querying other imaging devices (imaging devices 106 in this example) prior to distributing translators to the other imaging devices. By way of example, the computing device 108 comprises a server computer.

Figure 2:
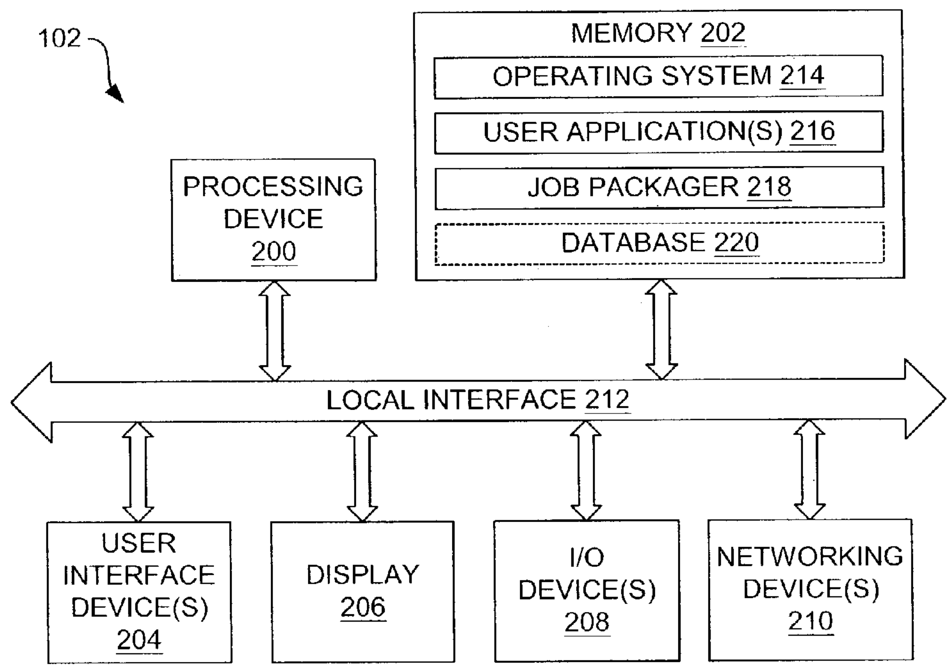
FIG. 2 is a schematic view of an embodiment of a computing device shown in FIG. 1.

FIG. 2 is a schematic view illustrating an example architecture for the user computing device 102 shown in FIG. 1. As indicated in FIG. 2, the computing device 102 comprises a processing device 200, memory 202, one or more user interface devices 204, a display 206, one or more input/output (I/O) devices 208, and one or more networking devices 210, each of which is connected to a local interface 212.

The processing device 200 can include any custom made or commercially available processor, a central processing unit (CPU) or an auxiliary processor among several processors associated with the computing device 102, a semiconductor based microprocessor (in the form of a microchip), or a macroprocessor. The memory 202 includes any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 204 comprise those components with which the user can interact with the computing device 102. For example, where the computing device 102 comprises a PC, these components can comprise a keyboard and mouse. Where the computing device 102 comprises a handheld device (e.g., PDA, mobile telephone), these components can comprise function keys or buttons, a touch-sensitive screen, etc. The display 206 can comprise a cathode ray tube (CRT) or liquid crystal display (LCD) monitor for a PC, or an LCD for a handheld device.

With further reference to FIG. 2, the one or more I/O devices 208 are adapted to facilitate connection of the computing device 102 to another device, such as an imaging device 104, and may therefore include one or more serial, parallel, small computer system interface (SCSI), universal serial bus (USB), IEEE 1394 (e.g., Firewire™), or other communication components. The networking devices 210 comprise the various components used to transmit and/or receive data over the network 108. By way of example, the network interface devices 210 include a device that can communicate both inputs and outputs, for instance, a modulator/demodulator (e.g., modem), wireless (e.g., radio frequency (RF)) transceiver, a telephonic interface, a bridge, a router, network card, etc.

The memory 202 comprises various programs, in software and/or firmware, including an operating system 214, one or more user applications 216, and a job packager 218. The operating system 214 controls the execution of other software and provides scheduling, input-output control, file and data management, memory management, and communication control and related services. The user applications 216 comprise applications that execute on the computing device 102 and from which print jobs can issue. By way of example, the user applications 216 can comprise a word processing application, an image manager, etc. As is discussed in greater detail below, the job packager 218 is configured to bundle a document file with one or more translators that can be used by an imaging device 104 to translate the document files into a language the device understands. In addition, the job packager 218 can be used to designate imaging devices to which the translator is to be distributed after it has been provided and/or installed on another imaging device. As is also indicated in FIG. 2, the memory 202 can, optionally, include a database 220 that is used to store various different translators. It is noted that, although this database 220 is shown as residing within the computing device 102 that, alternatively or in addition, this database or one like it may reside in a remote location, such as a network-accessible server.

Figure 3:
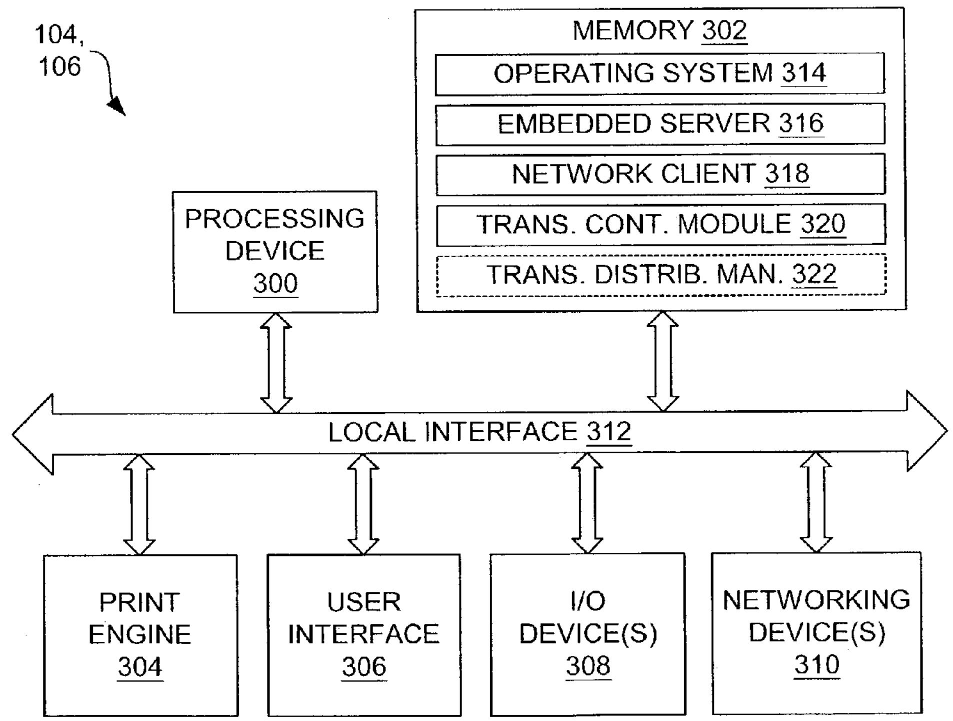
FIG. 3 is a schematic view of an embodiment of an imaging device shown in FIG. 1.

FIG. 3 is a schematic view illustrating an example architecture for the imaging devices 104 and 106 shown in FIG. 1. As indicated in FIG. 3, each imaging device 104, 106 can comprise a processing device 300, memory 302, a print engine 304, a user interface 306, one or more I/O devices 308, and one or more networking devices 310. Each of these components is connected to a local interface 312 that, by way of example, comprises one or more internal buses.

The processing device 300 is adapted to execute commands stored in memory 302 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the imaging device 104. The memory 302 can include any one or a combination of volatile memory elements (e.g., RAM) and nonvolatile memory elements (e.g., ROM, hard drive, etc.).

The print engine 304 comprises the components with which the imaging device 104 generates hardcopy documents. For example, the print engine 304 may comprise an electrophotographic (EP) print engine (not shown) that includes a photosensitive member, a charging device that forms a uniform electric charge on the photosensitive member, an optical scanner that selectively discharges portions of the photosensitive member to form a latent image on the member, and a developing device that develops the latent image by applying toner to the photosensitive member. In another embodiment, the print engine 304 may comprise an ink-based print engine (not shown) that comprises one or more liquid ink reservoirs that are associated with one or more inkjet mechanisms.

The user interface 306 comprises the tools with which the device settings can be changed and through which the user can communicate commands to the imaging device 104. By way of example, the user interface 306 comprises one or more function keys and/or buttons with which the operation of the imaging device 104 can be controlled, and a display, such as an LCD, with which information can be visually communicated to the user and, where the display comprises a touch-sensitive screen, commands can be entered. The one or more I/O devices 308 and the one or more network interface devices 310 operate and can have similar configuration to the like-named components described above with relation to FIG. 2.

The memory 302 includes various programs, in software and/or firmware, including an operating system 314, an embedded server 316, and a network client 318. The operating system 314 contains the various commands used to control the general operation of the imaging device 104. The embedded server 316 is configured to serve content over a network (e.g., network 108) and therefore provides a means for accessing the imaging device 104. The network client 318 is configured to access various network sources to, for example, retrieve translators.

The memory 302 further comprises a translator control module 320 that is used to identify, separate (if necessary), store, and install translators. The operation of the translator control module 320 is described in greater detail below in relation to FIG. 6. Furthermore, the memory 302 can, optionally, include a translator distribution manager 322, which is used to facilitate distribution of the installed translator to other devices. In the examples described below, it is assumed that at least the imaging device 104 comprises this manager 322.

Various programs have been described herein. These programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, operation of the systems will now be discussed. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 4:
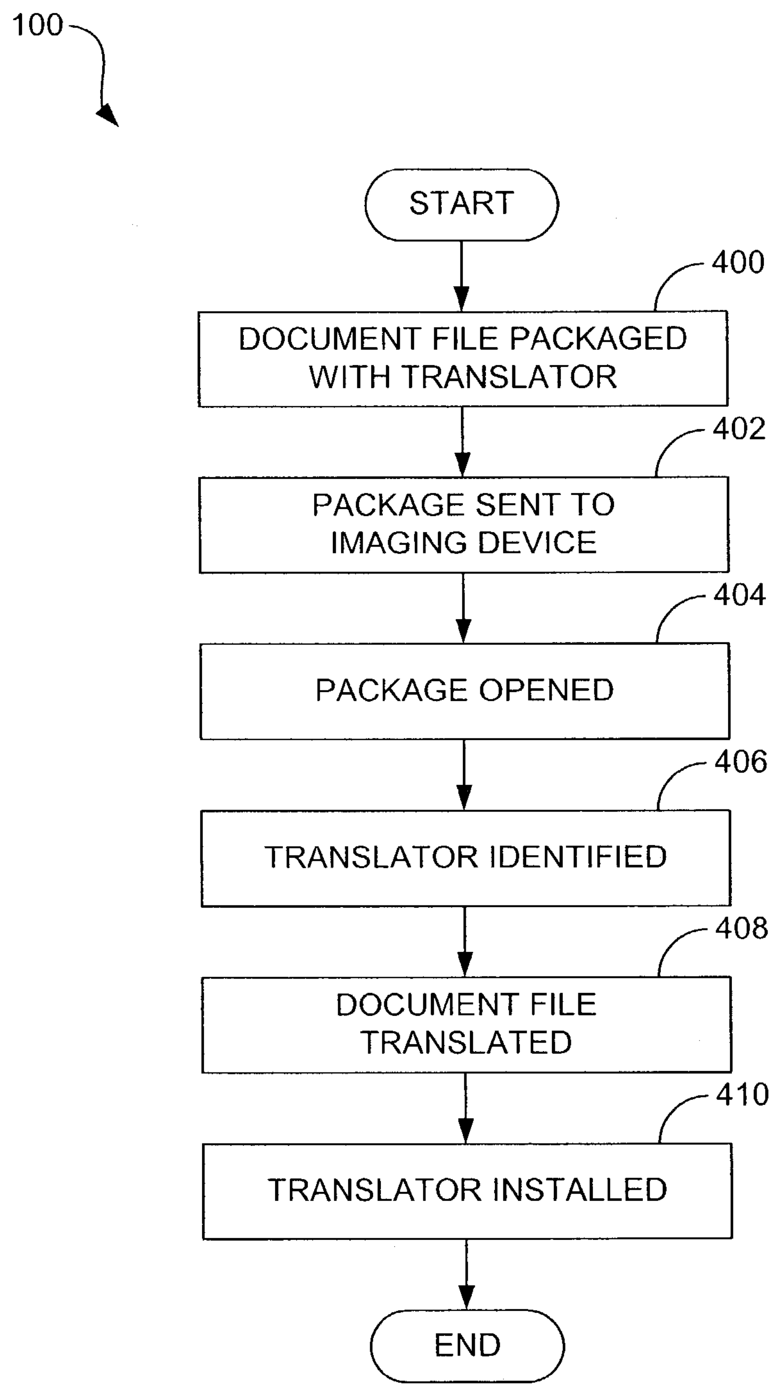
FIG. 4 is a flow diagram that illustrates an embodiment of operation of the system of FIG. 1 in facilitating translator installation.

Generally speaking, operation of the system involves facilitating distribution of a translator using an imaging device that has previously received, and typically has installed, the translator. The translator can first be provided to the imaging device by, optionally, providing a package including a document file and a translator to the imaging device. An example of such a procedure is described with reference to FIG. 4.

Beginning with block 400, a document file is packaged with a translator. Next, the package is sent to an imaging device that has been selected to generate a hardcopy of the document, as indicated in block 402. Once the package is received, it is opened, as indicated in block 404, and the translator is identified, as indicated in block 406. After the translator has been identified, it is separated from the document file and used to translate the document file, as indicated in block 408. At this point, the document file is now represented in machine code used by the imaging device and may therefore be used to generate the hardcopy document. The translator is installed on the imaging device, as indicated in block 410, for future use with document files of the same format or language as the translated file.

Figure 5A:
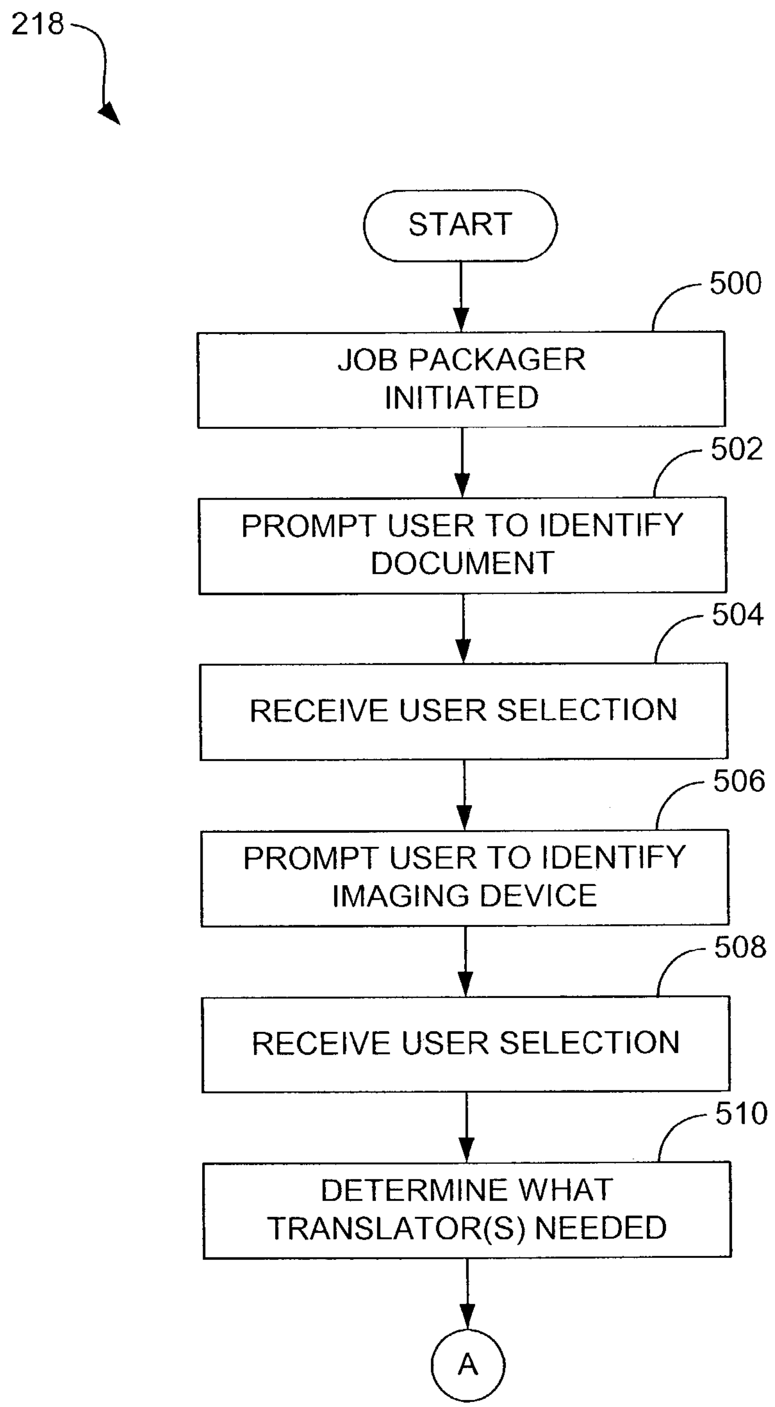
FIGS. 5A and 5B provide a flow diagram that illustrates an embodiment of operation of a job packager shown in FIG. 2.
Figure 5B:
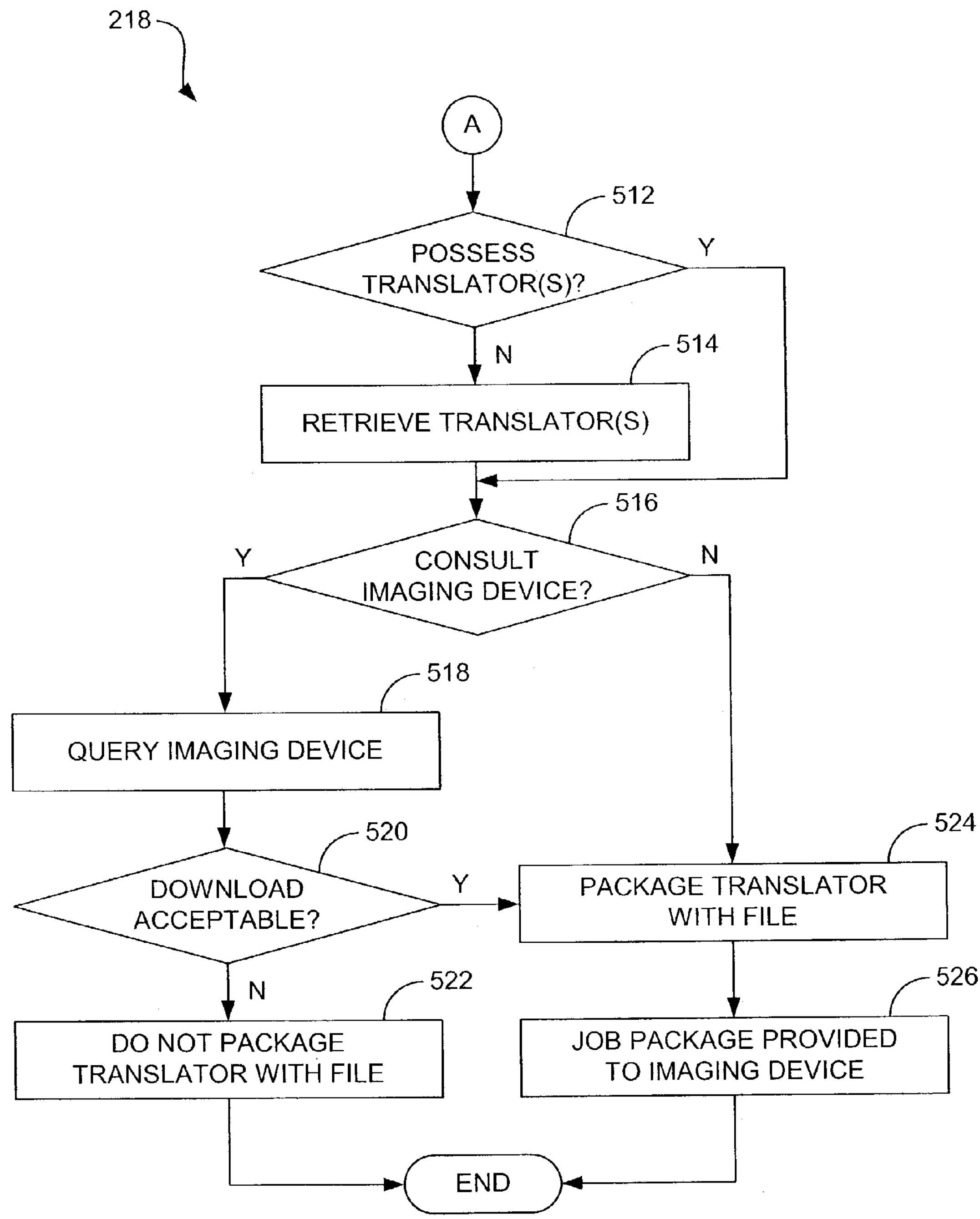

Packaging of document files with translators will now be discussed in greater detail with reference to FIGS. 5A and 5B. Beginning with block 500 of FIG. 5A, the job packager 218 is first initiated. This initiation can occur in several different ways. For example, initiation of the job packager 218 can occur in response to a command selected by a user from one of the user applications 216. In such a scenario, the user may have just completed creating or modifying a document. In another example, initiation can occur separate from the user application by opening a separate application associated with the job packager 218 on the computing device 104. In such a scenario, the user may not have created the document, but still may wish to generate a hardcopy.

Once the job packager 218 has been initiated, it can prompt the user to identify which document file is to be packaged along with a translator, as indicated in block 502. Notably, this step may be skipped where the job packager 218 was initiated directly from the user application 216. Under other circumstances, the selection can be made by the user by browsing through computing device memory 302. For example, the user can be presented with drop-down menus with which the user can browse the files of the computing device hard drive or disk drives in a free format. Once the selection has been made, the selection can be received, as indicated in block 504.

At this point, the job packager 218 can prompt the user to select the imaging device (e.g., imaging device 104) that the user wishes to use, as indicated in block 506. Again, the user can be presented with a drop-down menu to aid in the selection. Once this selection is made, it is received, as indicated in block 508, and the job packager 218 then determines which translator is needed, as indicated in block 510. The translators identified depend upon the imaging device 104 selected. Specifically needed is a translator that is configured to translate the original document file (e.g., Word™ file) into the machine language of the specific imaging device 104 that is to be used to generate a hardcopy document. The translator may comprise a translator for a new user application that the imaging device does not yet possess. Alternatively, the translator may be an updated version of a translator already possessed by the imaging device 104. Accordingly, the presently described process can be used to update the imaging device.

The translator can be obtained from, for instance, the database 220. Alternatively, the translator may be obtained from a separate translator source. Accordingly, with reference to decision block 512 of FIG. 5B, it is determined whether the needed translator is possessed. If so, for instance the pertinent translator is stored in the database 220, flow continues down to decision block 516 described below. If the translator is not possessed, however, flow continues to block 514 at which the translator is retrieved from an appropriate translator source. This translator source can, for instance, comprise a network-accessible server (e.g., a Web server that hosts a Web site of the manufacturer of the software used to create the document file or a the manufacturer of the selected imaging device).

Once the translator has been retrieved, or if it was already possessed (block 512), flow continues to decision block 516 at which it is determined whether to consult the imaging device 104 prior to providing the translator to the device. This determination may be, for example, dependent upon the setting that has been selected for the job packager 218. If no such consultation is necessary, flow continues down to block 524 described below. If, on the other hand, consultation is required, flow continues to block 518 and the imaging device 104 is queried to ask the device whether provision of the translator is acceptable. With regard to decision block 520, if such provision is acceptable, flow continues again to block 524. If not, for example if the imaging device 104 has been set by an authorized person (e.g., system administrator) not to accept the translator for any reason, flow continues to block 522 and the translator is not packaged with the document file.

If no consultation was necessary (block 516) or if transmission was identified as being acceptable (block 520), flow continues to block 524 at which the translator is packaged with the document file to create a job package that may be provided to the imaging device 104. Optionally, the package can be manipulated in various ways prior to provision to the imaging device. For instance, the package can be encrypted such that the package cannot be "opened" with another computing device but instead only used to generate hardcopies. At this point, the job package is provided to the imaging device 104, as indicated in block 526.

Various different methods can be used to provide the job package to the imaging device 104. By way of example, the package can be transmitted directly to the device 104 as a print job, or transmitted as an attachment in an email message. In another example, the job packager 218 can connect with the embedded server 316 of the imaging device 104 (if provided) and provide a non-local reference to the job package. In a further example, providing the job package can comprise transmitting a universal resource locator (URL) or file transfer protocol (FTP) address to the imaging device 104 so that the package can be accessed by the device using the network client 318 (if provided). Details as to these methods and others are described in detail in commonly assigned U.S. patent application Ser. No. 10/245,886, filed Sep. 16, 2002, which is hereby incorporated by reference in its entirety into the present disclosure.

Figure 6:
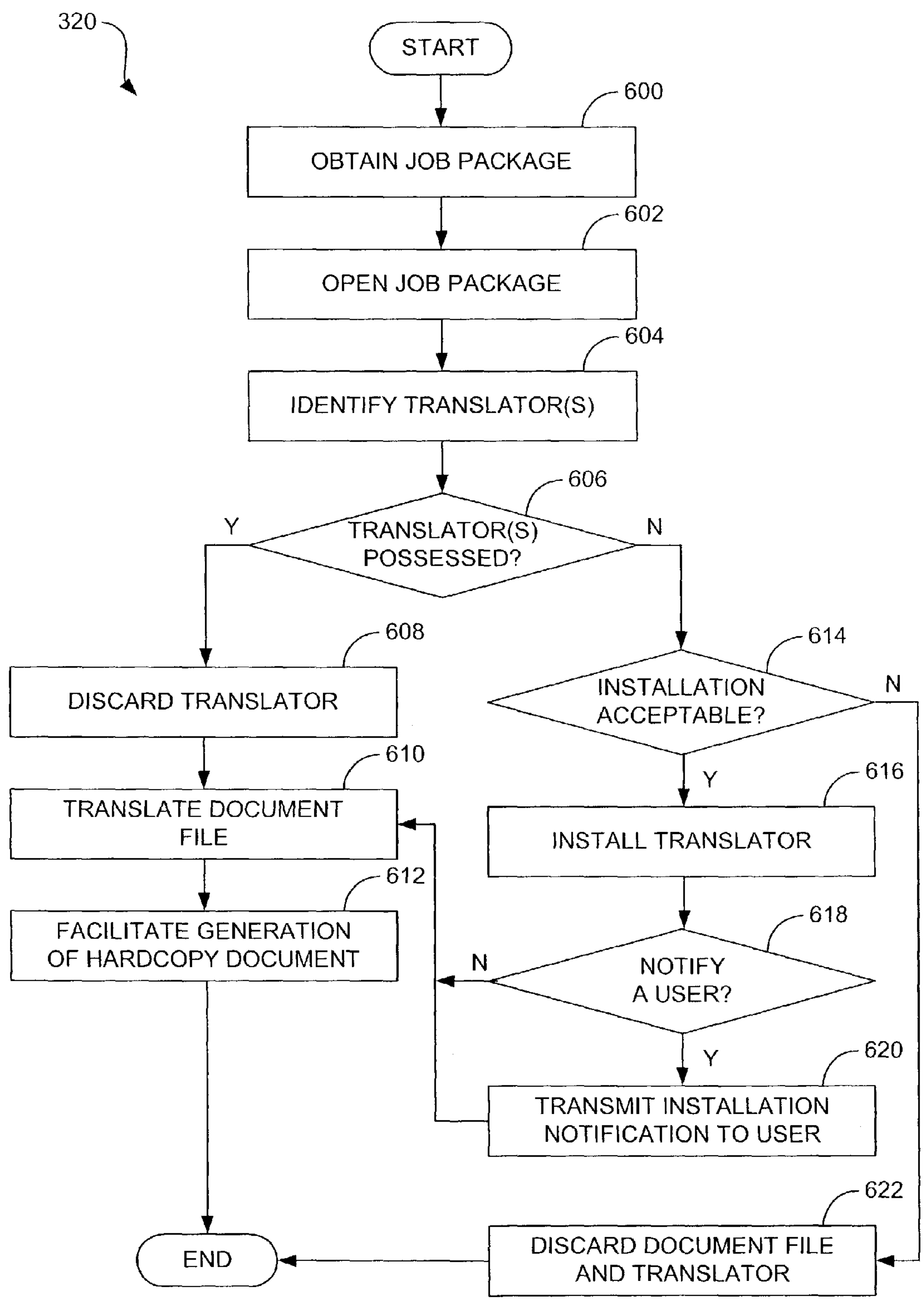
FIG. 6 is a flow diagram that provides an embodiment of operation of a translator control module shown in FIG. 3.

FIG. 6 illustrates an example of operation of the translator control module 320 of the imaging device 104. Beginning with block 600, the job package is obtained. For instance, the package can have been received from a sending device such as the user computing device 102. Alternatively, the job package can have been retrieved using an address provided by the computing device 102. In any case, the job package is opened, as indicated in block 602, and the translator contained therein identified, as indicated in block 604. At this point, with reference to decision block 606, the translator control module 320 can determine whether the translator is already possessed. In particular, the module 320 can determine whether that particular translator, i.e., the identical translator in type and version, is already installed on the imaging device 104. If the translator is already possessed, flow continues to decision block 608 at which the translator is discarded as unnecessary. In such a case, the same translator has already been installed and may be used to translate the document file, as indicated in block 610. By way of example, the translator can be used to translate the document into a page description language (PDL) file, a printer control language (PCL) file, an image file (e.g., JPEG, TIFF, etc.), or any other "print ready" format. At this point, the translator control module 320 can facilitate generation of a hardcopy document, as indicated in block 612.

With reference back to decision block 606, if the translator is not already possessed, flow continues to decision block 614 at which it is determined whether installation is acceptable. This determination may be made in view of several conditions. For example, if the imaging device 104 has been configured so as not to install any obtained translators, for instance in a set-up procedure by an authorized user (e.g., system administrator), installation is prohibited. In such a case, the translator, as well as the document file, may optionally be discarded, as indicated in block 622. Alternatively, one or both of the file and translator may be stored in memory for later use or for distribution to other imaging devices. In another alternative, installation may be deemed un-acceptable if there is insufficient storage space on the device to install it.

If installation is acceptable, however, flow continues to block 616, and the translator is installed on the imaging device 104. Due to this installation, the translator will be available to translate the document file, as well as other files of the same type that are later provided to the imaging device. Next, it can be determined whether to notify a user that the translator has been installed, as indicated in decision block 618. Such notification can be useful to a system administrator or other user that wishes to be apprised of what programs are installed on the imaging device 104. Again, this determination can be made in view of a configuration setting that has been selected by the user.

If no such notification is required, flow continues to block 610 described above, and the document file is translated using the installed translator. If notification is to be provided, flow continues to block 620, and an installation notification is transmitted to the pertinent user. Through this notification, the user is apprised of the installation of the translator. At this point, flow continues to block 610 at which the file is translated, and then to block 612 at which a hardcopy document is generated.

Figure 7:
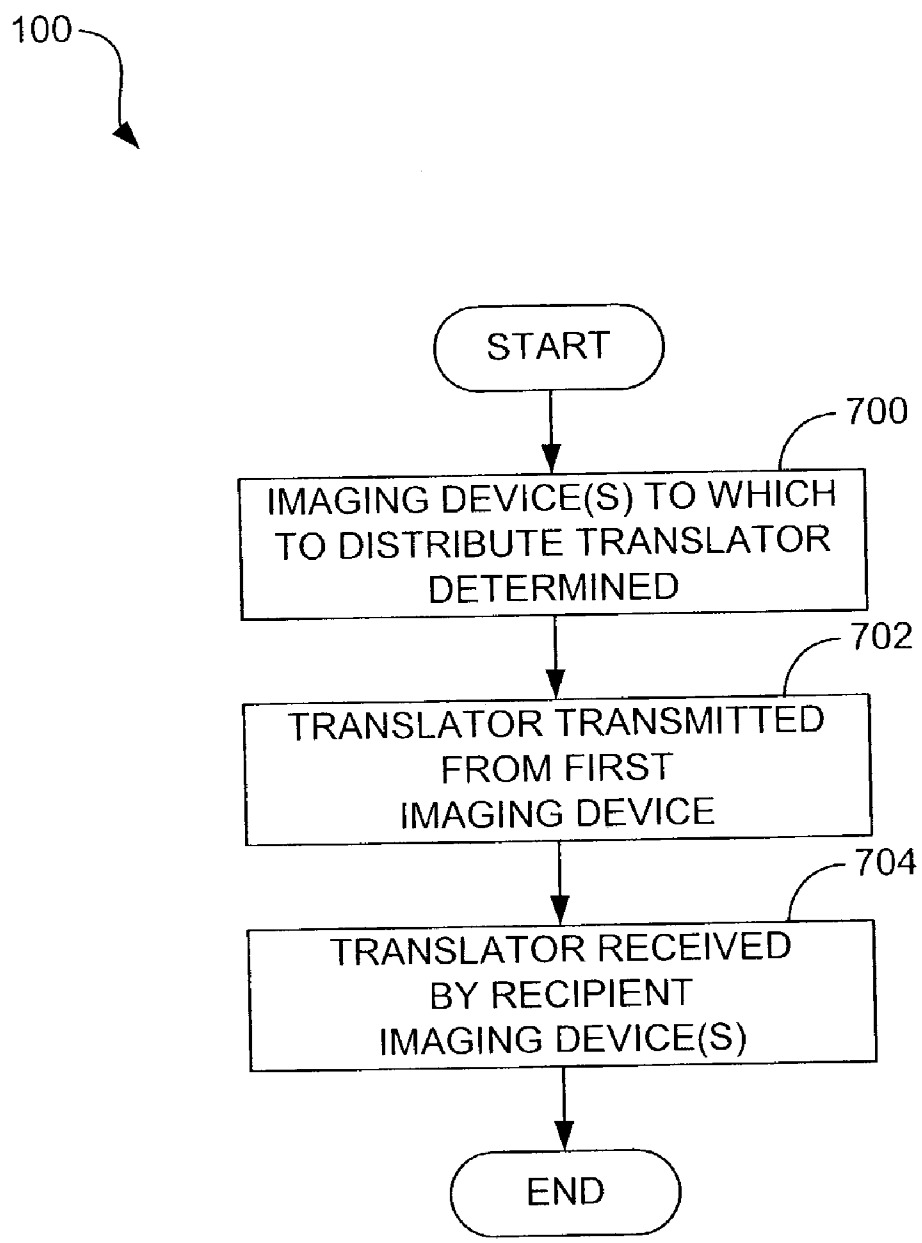
FIG. 7 is a flow diagram that illustrates an embodiment of operation of the system of FIG. 1 in facilitating translator distribution.

Once a translator has been provided to, and optionally installed on, the imaging device 104 in the manner described above with reference to FIGS. 4-6, or if the translator has otherwise been provided to the imaging device, the imaging device can facilitate distribution to other devices (e.g., the other imaging devices 106). An overview of such distribution is described with reference to FIG. 7.

Beginning with block 700, the imaging device or devices 106 to which to distribute the translator are identified. This identification can be facilitated by user selections received by the imaging device 104 (i.e., the first imaging device) either in the package containing the translator sent to the imaging device, or sometime thereafter. As described below, identification can further be facilitated using the auxiliary computing device 112. Once the identification has been made, the first imaging device 104 can transmit the translator, as indicated in block 702. This transmission typically comprises a peer-to-peer transmission from the first imaging device 104 to the one or more other imaging devices 106 (i.e., recipient imaging devices). Alternatively, however, this transmission may comprise transmission to an intermediate device, such as the auxiliary computing device 112, which then forwards the translator to the recipient imaging devices 106. At this point, the recipient imaging devices 106 then receive the translator, as indicated in block 704, and the translators may then be installed, if desired, on the recipient imaging devices.

Figure 8A:
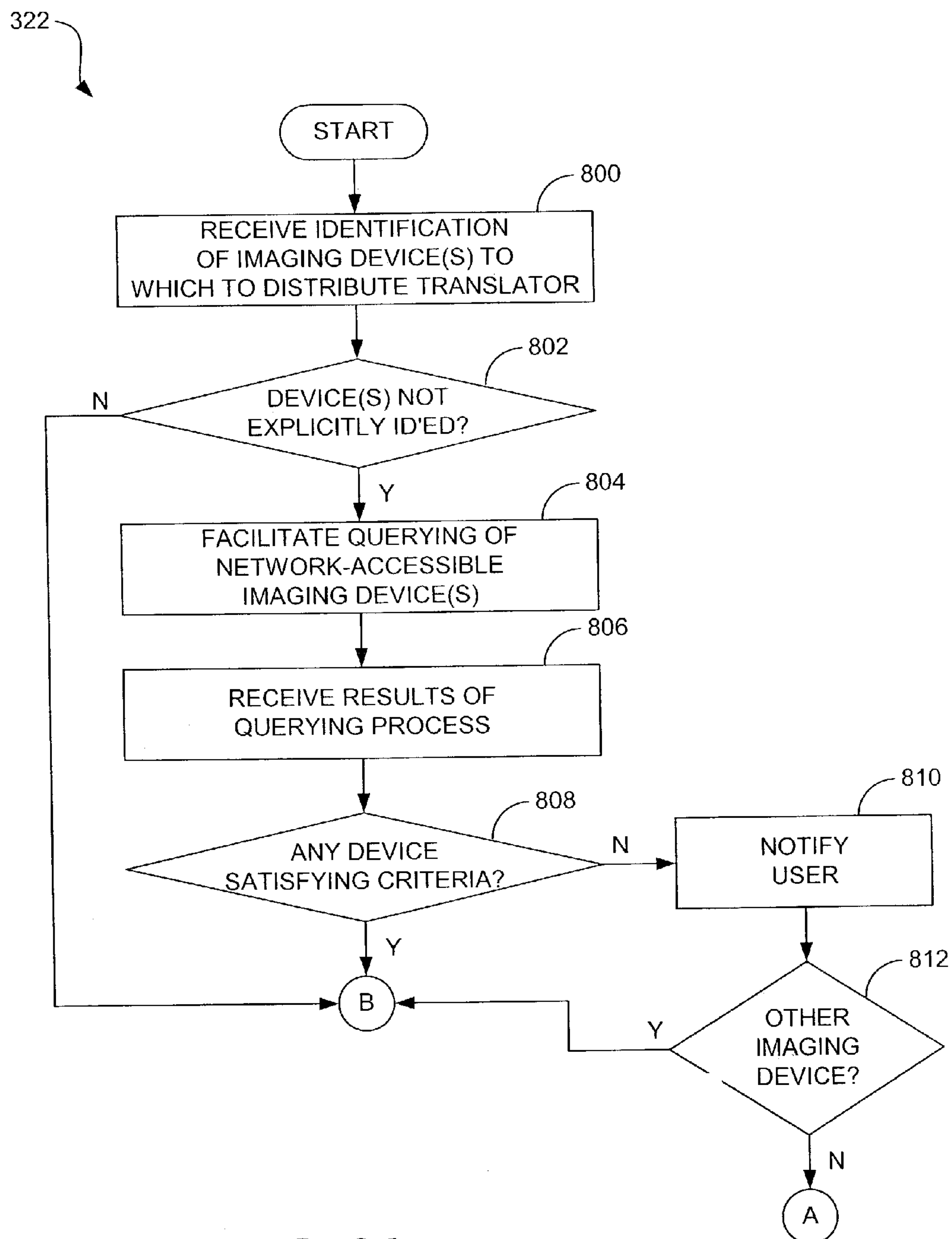
FIGS. 8A and 8B provide a flow diagram that illustrates an embodiment of operation of a translator distribution manager shown in FIG. 3.

An example of operation of the translator distribution manager 322 of the first imaging device 104 will now be described with reference to FIGS. 8A and 8B. Beginning with block 800 of FIG. 8A, the translator distribution manager 322 is activated upon receiving identification of one or more imaging devices 106 (i.e., recipient imaging devices) that are to receive the translator. This identification can be communicated to the imaging device 104 (i.e., the first imaging device), and more particularly to the translator distribution manager 322, in several different ways. As mentioned above in relation to FIG. 7, the recipient imaging devices 106 may be identified in a package (e.g., in a file header) that contains the translator that is sent to the first imaging device 104. In such a case, the user can be prompted, for instance in the flow of FIG. 5A (e.g., after prompting the user to identify the first imaging device 104 in block 506), to identify the recipient imaging devices 106. For example, the user sending the package can be prompted with a pop-up box or other window that permits the user to browse through a list of known, network-accessible imaging devices 106. Alternatively, the user may be prompted by prompting the user to identify criteria that identify the imaging devices 106 to which the translator is to be distributed.

In the former case, the recipient imaging devices 106 may be explicitly identified. In such a case, identification may comprise identification of a network address of the recipient imaging devices. This address can, for instance, comprise the Internet protocol (IP) address of each imaging device 106, the media access control (MAC) address of a network card of the imaging device, or the host name of the imaging device. Where such information is not presented to the user for selection, the user may, alternatively, manually enter it (e.g., in a presented editable field) in a suitable network language such as extensible markup language (XML).

Where the user instead wishes to provide criteria that pertain to the recipient imaging devices 106, these criteria may comprise, for instance, imaging devices of the same model as the first imaging device 104, imaging devices of the same manufacturer of the first imaging device, imaging devices of the same type (e.g., MFP devices), imaging devices having a certain capability (e.g., faxing capability), imaging devices connected to a given network or sub-network, imaging devices within a given geographical area, imaging devices that speak a given language (e.g., PCL), etc. Where such criteria are identified, the first imaging device 104, or an agent thereof (e.g., the auxiliary computing device 112), can determine which recipient imaging devices 106 satisfy the given criteria. Notably, several different criteria may be specified at the same time. For example, the user may specify imaging devices 106 having a certain capability that are also within a given geographical area.

Although identification of recipient imaging devices 106 has been described as being accomplished when the translator is sent to the first imaging device 104, the recipient imaging devices can be identified thereafter. For instance, when a new imaging device 106 is added to the network 110, the user may wish to distribute a translator already received by the first imaging device 104 to the new imaging device. In such a case, recipient imaging device 106, as well as the translator to be distributed to it, can be identified, for example, with an XML command sent to the first imaging device 104, or through interaction with a network page hosted by the first imaging device's embedded server 316.

Irrespective of the manner in which the recipient imaging devices 106 are identified, the translator distribution manager 322 next determines whether any imaging devices 106 are not explicitly identified, as indicated in decision block 802. In other words, it is determined whether the user has identified any criteria from which suitable recipient imaging devices 106 are to be determined. If all recipient imaging devices 106 that are to receive a translator have been explicitly identified, flow continues down to decision block 814 of FIG. 8B. If, on the other hand, imaging device criteria are provided, flow continues to block 804 at which the translator distribution manager 322 facilitates querying of network-accessible imaging devices to determine which of these devices satisfy the provided criteria. Notably, this querying can be conducted by the translator distribution manager 322 via network communications with the other imaging devices 106 to which it has access. For instance, such communications may be in XML, PCL, printer management language (PML), PostScript, hypertext markup language (HTML), or any other suitable language that may be "spoken" by the imaging devices 106.

Alternatively, the translator distribution manager 322 can leverage the auxiliary computing device 112 (e.g., a print server) to query the various imaging devices 106. In such a case, facilitating querying comprises sending a command to the auxiliary computing device 112 requesting it to identify all network-accessible imaging devices 106 that satisfy the stated criteria.

Once the querying process has been completed, i.e., once all queried devices have responded, the results of the querying process are received, as indicated in block 806. Notably, although the querying process is described as being used to determine which imaging devices 106 satisfy the criteria, this determination can, alternatively, be made by the translator distribution manager 322, or the auxiliary computing device 112 when acting as its agent, by referring to a database that contains this information. This alternative may be viable in situations in which the database is continually updated either manually or automatically (e.g., where new imaging devices 106 identify themselves and their configurations upon being connected to the network 110).

If a querying process is used, once the query results have been received (either from the imaging devices 106 directly or from the auxiliary computing device 112 as the case may be) the translator distribution manager 322 determines, in decision block 808, whether any imaging device 106 satisfies the provided criteria. If not, the user is notified as to this condition, as indicated in block 810. At this point, flow continues to decision block 812 at which it is determined whether any other imaging devices 106 (that were explicitly identified or which satisfy other provided criteria) remain. If not, flow for the session is terminated, as indicated in FIG. 8B. If so, however, flow continues to decision block 814 of FIG. 8B.

Figure 8B:
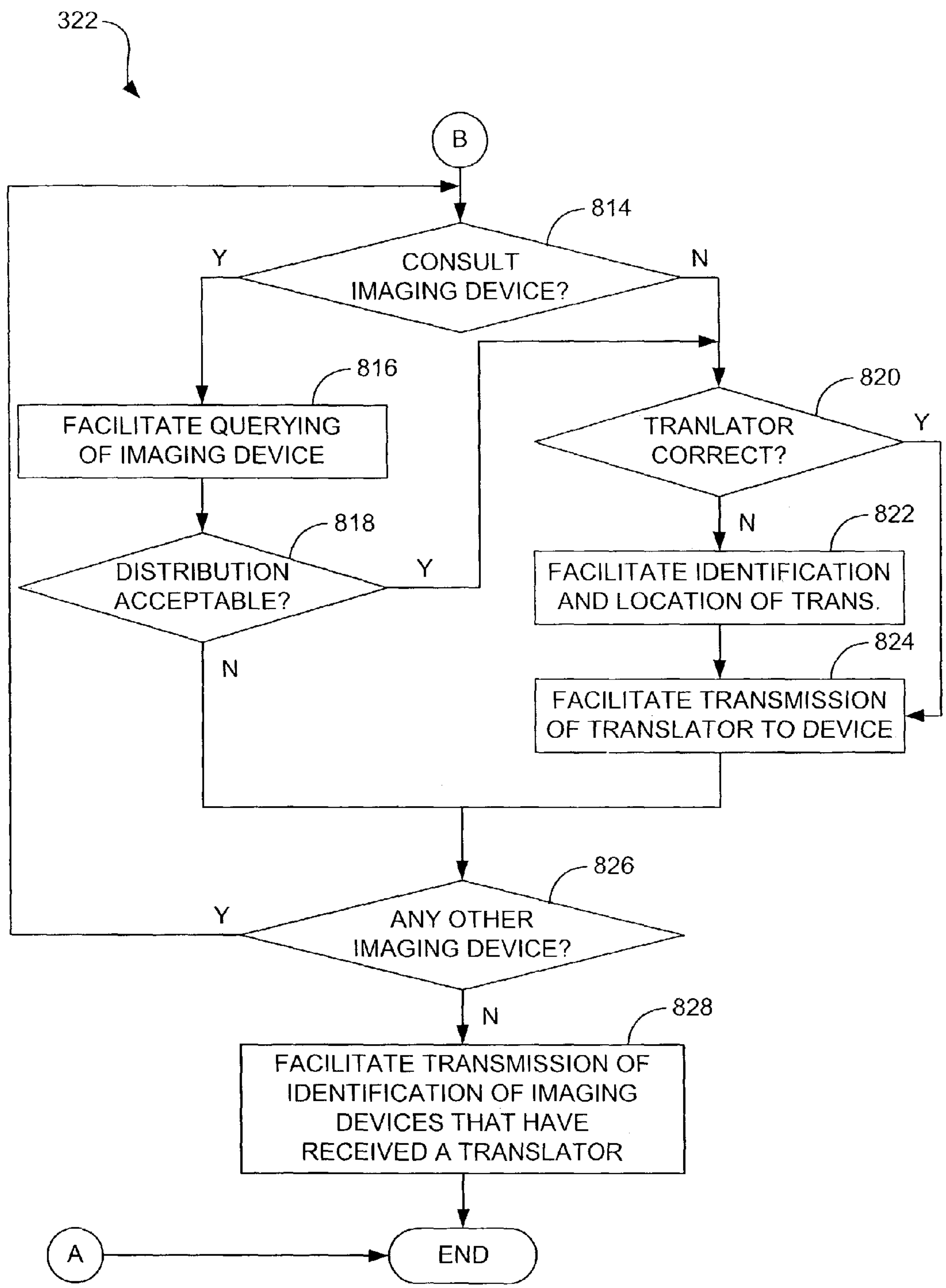

With reference to decision block 814 of FIG. 8B, the translator distribution manager 322 next determines, as to a given recipient imaging device 106, whether to consult the device prior to facilitating distribution of the translator to the device. This determination may be, for example, dependent upon the setting that has been selected for the given recipient imaging device 106. If no such consultation is necessary, flow continues down to decision block 820 described below. If consultation is required for one or more of the recipient imaging devices 106, however, flow continues to block 816 and the translator distribution manager 322 facilitates querying of each recipient imaging device to ascertain whether provision of the translator is acceptable. Again, this querying can be conducted directly by the translator distribution manager 322, or can be conducted by the auxiliary computing device 112 at the behest of the translator distribution manager 322.

With regard to decision block 818, if provision of the translator is acceptable, flow continues again to decision block 820. If not, for example if a recipient imaging device 106 has been set by an authorized person (e.g., system administrator) not to accept the translator for any reason, flow continues to block 826 described below.

If no consultation was necessary (block 814) or if transmission was identified as being acceptable (block 818), flow continues to decision block 820 at which the translator distribution manager 322 determines whether the translator version is correct for the imaging device 106 that is to be provided with a translator. This determination can, again, be made through direct or indirect (via the auxiliary computing device 112) communications with the recipient imaging device 106. For instance, the recipient imaging device 106 can be queried for its firmware version so that it can be determined whether the translator may be used in conjunction with that firmware. If the translator version is correct, flow continues to block 824 described below. If not, however, the translator distribution manager 322 facilitates identification and location of the correct translator version, as indicated in block 822. In this latter step, either the translator distribution manager 322 seeks the translator via the network client 318, or the auxiliary computing device 112 is relied upon for this purpose.

With reference to block 824, the translator distribution manager 322 facilitates transmission of a translator to a recipient imaging device 106. This facilitation can comprise initiating direct transmission of the translator from the first imaging device 104 to the recipient imaging device 106, or indirect transmission of the translator through the auxiliary computing device 112. Where, as in block 822, a different translator than that possessed by the first imaging device 104 has been identified, facilitating transmission of a translator may comprise either retrieving the appropriate translator and then transmitting it to the recipient imaging device 106 (either directly or indirectly), or identifying the location (e.g., network address) where the translator may be found so that the recipient imaging device may retrieve it. In any case, actual transmission can be delayed, if desired, to a predetermined time. This feature may be particularly useful where it is desired to transmit the translator to several different recipient imaging devices 106 at a time when network traffic is lowest (e.g., at night).

Once a determination has been made that distribution is not acceptable (block 818) or transmission of a translator has been facilitated (block 824), flow continues to decision block 826 at which the translator distribution manager 322 determines whether there are any other imaging devices 106 that have neither been consulted nor have received a translator. If such other imaging devices 106 exist, flow returns back to decision block 814 and the above-described process is again followed. If, on the other hand, all such recipient imaging devices 106 have been consulted and/or have been provided with a translator, flow continues to block 828 at which the translator distribution manager 828 facilitates transmission of identification of all recipient imaging devices 106 that have received, and presumably installed, a translator. Through this step, tracking of what imaging device has which translator is simplified for the system administrator.

What is claimed is:

1. A method for facilitating distribution of a translator, comprising:

identifying devices that are to receive the translator; and facilitating transmission of the translator from a first imaging device that possesses the translator, wherein transmission of the translator from the first imaging device facilitates receipt of the translator by the devices identified to receive the translator.

2. The method of claim 1, wherein identifying devices comprises identifying recipient imaging devices that are to receive the translator.

3. The method of claim 1, wherein identifying devices comprises identifying the devices from an explicit user identification.

4. The method of claim 1, wherein identifying devices comprises identifying the devices from user-provided criteria.

5. The method of claim 4, wherein identifying the devices from user-provided criteria comprises facilitating querying of a network-accessible device to determine if it satisfies the criteria.

6. The method of claim 5, wherein facilitating querying comprises directly querying the devices.

7. The method of claim 5, wherein facilitating querying comprises directing a computing device to query the devices.

8. The method of claim 4, wherein identifying the devices from user-provided criteria comprises consulting a database that contains information about the device.

9. The method of claim 1, wherein facilitating transmission comprises facilitating direct transmission from the first imaging device in a peer-to-peer communication.

10. The method of claim 1, wherein facilitating transmission comprises facilitating transmission from the first imaging device to a computing device.

11. A method for facilitating distribution of a translator from a first imaging device to a recipient imaging device, comprising:

identifying the recipient imaging device based upon a user selection provided to the first imaging device; and facilitating transmission of the translator from the first imaging device to the recipient imaging device in a peer-to-peer exchange via a network, such that the translator may be received by and installed on the recipient imaging device.

12. The method of claim 11, wherein identifying the recipient imaging device comprises querying the recipient imaging device in relation to certain user-provided criteria.

13. The method of claim 11, wherein identifying the recipient imaging device comprises consulting a database that contains information about the recipient imaging device.

14. The method of claim 11, further comprising determining if transmission of the translator is acceptable to the recipient imaging device prior to facilitating transmission.

15. The method of claim 11, further comprising determining if the translator is of a version that is suitable for the recipient imaging device prior to facilitating transmission.

16. The method of claim 11, further comprising facilitating transmission of identification that the recipient imaging device has received a translator.

17. A system for distributing a translator to a recipient imaging device, comprising:

a job packager to identify devices that are to receive a translator that is possessed by a first imaging device; and means for delivering the possessed translator from the first imaging device to a recipient imaging device.

18. A translator distribution manager stored on a non-transitory computer-readable medium, comprising:

logic configured to receive information pertinent to imaging devices to receive a translator;

logic configured to identify recipient imaging devices based upon the received information; and logic configured to facilitate transmission of the translator from a first imaging device to the identified recipient imaging devices so that the translator may be received by and installed on the recipient imaging devices.

19. The translator of claim 18, wherein the logic configured to receive information comprises logic configured to receive user-provided criteria that pertain to the recipient imaging devices.

20. The translator of claim 18, wherein the logic configured to identify comprises logic configured to query the recipient imaging device as to information related to the user-provided criteria.

21. An imaging device, comprising:

a print engine;

a processing device; and memory, the memory comprising a translator distribution manager that is configured to receive information pertinent to imaging devices that are to receive a translator, to identify recipient imaging devices based upon the received information, and to facilitate transmission of the translator from a first imaging device to the identified recipient imaging devices so that the translator may be received by and installed on the recipient imaging devices.

22. The device of claim 21, wherein the manager is further configured to receive user-provided criteria that pertain to the recipient imaging devices.

23. The device of claim 22, wherein the manager is further configured to query the recipient imaging device as to information related to the user-provided criteria.

24. The device of claim 21, wherein the manager is further configured to determine if transmission of the translator is acceptable to the recipient imaging device prior to facilitating transmission.

25. The device of claim 21, wherein the manager is further configured to determine if the translator is of a version that is suitable for the recipient imaging device prior to facilitating transmission.

26. The device of claim 21, wherein the manager is further configured to facilitate identification of recipient imaging devices that has received a translator.

27. The method of claim 1 further comprising transmitting a package to the first imaging device including a document file written in a first language and the translator, wherein the translator is configured to translate the document file into a second language.

28. The method of claim 1 further comprising transmitting the translator to the first imaging device with data identifying other recipient imaging devices that are to receive the translator.

* * * * *